United States Patent Office 2,916,502
Patented Dec. 8, 1959

2,916,502

SEPARATION OF MONOCARBOXYLIC AND DICARBOXYLIC ACIDS

Robert R. Allen, Sherman, Tex., and Arthur A. Kiess, Hinsdale, Ill.; said Allen and said Kiess assignors to Armour and Company, Chicago, Ill., a corporation of Illinois No Drawing. Application February 24, 1956
Serial No. 567,450

6 Claims. (Cl. 260—419)

This invention relates to a method for the treatment of mixtures containing mono- and dicarboxylic acids to effect separation of said acids from each other.

Certain commercial processes involve the production of mixtures of mono- and dicarboxylic acids, which types of acids are more valuable when in separated form than when mixed with each other. A typical example illustrating the starting point for the present invention is the mixture of pelargonic, azelaic, and other acids resulting from the treatment of oleic acid with an oxidizing agent to produce cleavage at the double bond. In this reaction one obtains azelaic acid, pelargonic acid, and other fatty acids such as palmitic, myristic, lauric, and capric acids. All these acids have a certain value, but their value is enhanced if they can be obtained in substantially pure form, free of the other acids. Thus, for example, the value of a fraction comprising substantially pure azelaic acid is well known in polymerization reactions such as those involved in the preparation of polyamides.

It is an object of the present invention to provide a process for separating mixtures such as those referred to above. It is a further object of the invention to provide a method involving a simple liquid-liquid extraction utilizing commonly available materials in performing the desired separation. Other objects and advantages of the invention will appear as the specification proceeds.

The process of the present invention comprises the steps of introducing a mixture containing monocarboxylic and dicarboxylic acids into an aqueous solvent, such as an aqueous polyalcohol or a monoalkyl ether thereof, and contacting the resulting mixture with a low boiling, straight chain hydrocarbon solvent to effect separation of the mono- and dicarboxylic acids.

The starting material for the practice of the invention may be any mixture containing both mono- and dicarboxylic acids. The invention has particular usefulness in connection with mixtures containing monocarboxylic acid having greater than 4 carbon atoms and dicarboxylic acids having from 4 to 22 carbon atoms. Thus, for example, the monocarboxylic acid may be butyric, valeric, caproic, pelargonic, capric, lauric, myristic, palmitic, stearic, oleic and the like acids, while the dicarboxylic acids may be succinic, glutaric, adipic, pimelic, suberic, azelaic, sebacic, dodecandioic, docosadioic, and the like acids.

The starting materials may be mixtures which have been synthetically prepared or, in the more general use of the invention, they may be mixtures of mono- and dicarboxylic acids resulting from the disruptive oxidation of unsaturated fatty acids such as decenoic, dodecenoic, palmitoleic, oleic, ricinoleic, petroselinic, vaccenic, linoleic, linolenic, eleosteric, arachidonic, erucic, and the like acids. The starting material may also be obtained from the disruptive oxidation of mixtures of acids such as are derived from tallow, soya bean oil, cottonseed oil, coconut oil, and others of the natural fats and oils. The disruptive oxidation which provides the starting mixture for the practice of the present invention may be carried out in any of the several known ways for bringing about cleavage of the fatty acid molecule at the double bond. For example, unsaturated acids may be oxidized by treatment with permanganate in an acetone solution, or by ozonolysis, or by treatment with nitric acid, or admixtures of sodium dichromate and sulfuric acid.

In the practice of the present invention, the mixture of mono- and dicarboxylic acids to be separated is first introduced into an aqueous solvent comprising either a polyalcohol or a monoalkyl ether of a polyalcohol. Examples of the polyalcohol are ethylene glycol, propylene glycol, glycerol, trimethylene glycol, and the like. Examples of the monoalkyl ethers of polyalcohols are ethylene glycol monomethyl ether, ethylene glycol monethyl ether, ethylene glycol monopropyl ether, ethylene glycol monobutyl ether, and other similar ethers, some of which are sold commercially under the trade name Cellosolves. It is an element of the invention that the polyalcohol or the ether be used as an aqueous solution, and in order to obtain satisfactory results it is usually desired to employ a solvent-to-water ratio of from .25:1 to 10:1. A ratio of from 1:1 to 6:1 is preferred, and excellent results are obtained with a solvent-to-water ratio of about 4:1, this ratio and all of the foregoing being expressed in terms of volume.

The solution or dispersion resulting from introducing the mixture of mono- and dicarboxylic acids into the aqueous polyalcohol or ether is then contacted with a low boiling, straight chain hydrocarbon to effect separation of the mono- from the dicarboxylic acids. More particularly, the hydrocarbons useful in the present invention may be described as petroleum fractions or petroleum distillate mixtures having boiling points in the range of 30 to 100° C. By petroleum fractions or petroleum distillate mixtures are meant hydrocarbons having chemical and physical properties related to the prime fractions of crude petroleum obtained as distillates boiling at temperatures of about 30 to 100° C. These petroleum fractions are characterized primarily by their boiling temperatures and are available commercially as the "Skellysolve," series, e.g., Skelly B, C, F, G, H, etc.

It has been found that when the mixture of mono- and dicarboxylic acids is introduced into the aqueous polyalcohol or ether solvent and the resulting mixture contacted with the hydrocarbon solvent, the monocarboxylic acids are completely removed from the aqueous solution and taken up in the hydrocarbon phase, thus leaving the dicarboxylic acids in substantially pure form in the aqueous phase. The desired liquid-liquid extraction may be carried out by any suitable means. The type or form of extraction equipment may be varied according to the circumstances, and all that is required is that the aqueous phase be continuously contacted with the hydrocarbon under such conditions and for a length of time sufficient to bring about the substantially complete separation which is possible with the materials of the present invention. In the use of conventional liquid-liquid extraction apparatus, a period of 6 hours, for example, has been found sufficient in most cases to achieve the objects of this invention, although of course a shorter period of time may serve the purpose if more efficient extraction equipment is used, and of course longer periods of treatment have no harmful effect.

Following the sharp, quantitative separation described above, the mono- and dicarboxylic acids may be recovered from their respective solvents by any suitable means, such as, for example, by distillation, crystallization, or other known procedures for removing solvents.

The following examples will serve to further illustrate the invention.

*Example 1*

1 gm. of a 1:1 (on a weight to weight basis) mixture of caproic acid and dodecandioic acid was dissolved in 40 ml. of 4:1 (on a volume to volume basis) ethylene glycol-water. Continuous liquid-liquid extraction of the mixture with 40 ml. of Skellysolve F, i.e., a petroleum hydrocarbon fraction having a boiling point of from 40 to 60° C., was carried out for 6 hours. The aqueous solution was separated from the hydrocarbon solution, and analysis of the two solutions by chromatography showed that only docecandioic acid was in the aqueous phase and only caproic acid was in the hydrocarbon phase.

*Example 2*

A 1:1 (on a weight to weight basis) mixture of pelargonic and azelaic acids was dissolved in 15 ml. of 1:1 (on a volume to volume basis) ethylene glycol-water and extracted for 6 hours with Skellysolve F, i.e., a petroleum hydrocarbon fraction having a boiling point of from 40 to 60° C., in a liquid-liquid extractor. Analysis of the two solutions indicated a trace of azelaic acid in the pelargonic but no pelargonic acid was detected in the azelaic acid.

*Example 3*

1 gm. of a 1:1 (weight basis) mixture of butyric and adipic acids was dissolved in 40 ml. of a 4:1 (volume basis) mixture of glycerol and water. After 4 hours of liquid-liquid extraction with Skellysolve F, i.e., a petroleum hydrocarbon fraction having a boiling point of from 40 to 60° C., pure butyric acid was found in the hydrocarbon extract and pure adipic acid remained in the glycerine water mixture.

*Example 4*

A 1:1 (on a weight to weight basis) mixture of pelargonic and azelaic acids were dissolved in a 4:1 (volume basis) mixture of methyl Cellosolve (glycol monomethyl ether) and extracted with Skellysolve B, i.e., a petroleum hydrocarbon fraction having a boiling point of from 60 to 80° C., in a liquid-liquid extractor. Analysis of the two solutions indicated no pelargonic acid in the azelaic and a trace of azelaic acid in the pelargonic acid.

*Example 5*

A 1:1 mixture (weight basis) of docosadioic and stearic acids was mixed with 40 ml. of 1:4 (volume basis) water and methyl Cellosolve and extracted with Skellysolve B, i.e., a petroleum hydrocarbon fraction having a boiling point of from 60 to 80° C. Analysis of the two solutions indicated pure docosadioic acid in the aqueous solvent while the Skellysolve B contained a mixture of 95% stearic and 5% docosadioic acid.

While in the foregoing specification various embodiments of this invention have been set forth and specific details thereof elaborated for purpose of illustration, it will be apparent to those skilled in the art that this invention is susceptible to other embodiments and that many of these details may be varied widely without departing from the basic concept and spirit of the invention.

We claim:

1. A process for the treatment of a mixture containing a monocarboxylic acid having greater than 4 carbon atoms and a dicarboxylic acid having from 4 to 22 carbon atoms comprising the steps of introducing said mixture into an aqueous solvent selected from the group consisting of aqueous aliphatic polyalcohols and monoalkyl ethers thereof and contacting the resulting mixture with a petroleum distillate mixture having a boiling point in the range of 30 to 100° C. to effect separation of said monocarboxylic and dicarboxylic acids.

2. The process of claim 1 wherein said aqueous solvent is aqueous glycerol.

3. The process of claim 1 wherein said aqueous solvent is aqueous ethylene glycol.

4. The process of claim 1 wherein said aqueous solvent is aqueous glycol monomethyl ether.

5. A process for the treatment of a mixture containing caproic acid and docecandioic acid comprising the steps of introducing said mixture into aqueous ethylene glycol and contacting the resulting mixture with a petroleum distillate mixture having a boiling point in the range of about 40 to 60° C. to effect separation of said caproic and dodecandioic acid.

6. A process for the treatment of a mixture containing pelargonic acid and azelaic acid comprising the steps of introducing said mixture into aqueous ethylene glycol and contacting the resulting mixture with a petroleum distillate mixture having a boiling point in the range of about 40 to 60° C. to effect separation of said pelargonic and azelaic acids.

References Cited in the file of this patent

UNITED STATES PATENTS

| | | |
|---|---|---|
| 2,389,191 | Fitzpatrick et al. | Nov. 20, 1945 |
| 2,696,500 | Stein | Dec. 7, 1954 |
| 2,749,364 | Greenberg | June 5, 1956 |